US012051382B2

(12) United States Patent
Wang et al.

(10) Patent No.: US 12,051,382 B2
(45) Date of Patent: Jul. 30, 2024

(54) SYSTEM AND METHOD FOR CONTROLLING BACK LIGHT UNIT

(71) Applicant: LX SEMICON CO., LTD., Daejeon (KR)

(72) Inventors: Yun Sung Wang, Daejeon (KR); Soon Hyeok Kwak, Daejeon (KR); Jang Su Kim, Daejeon (KR); Sang Suk Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/083,032

(22) Filed: Dec. 16, 2022

(65) Prior Publication Data

US 2023/0197021 A1 Jun. 22, 2023

(30) Foreign Application Priority Data

Dec. 21, 2021 (KR) ........................ 10-2021-0183618

(51) Int. Cl.
*G09G 3/34* (2006.01)

(52) U.S. Cl.
CPC ..... *G09G 3/3426* (2013.01); *G09G 2320/064* (2013.01)

(58) Field of Classification Search
CPC ........................ G09G 3/3426; G09G 2320/064
See application file for complete search history.

(56) References Cited

U.S. PATENT DOCUMENTS 11,587,516 B2 * 2/2023 Kang .................. G09G 3/2081
11,615,752 B2 * 3/2023 Lee .......................... G09G 5/10 345/204
2004/0207620 A1 * 10/2004 Ra ........................ G09G 3/3406 345/213
2015/0102227 A1 * 4/2015 Nyg rd .................. H04N 25/63 250/370.09
2022/0139345 A1 * 5/2022 Kang .................. G09G 3/2014 345/694

* cited by examiner

*Primary Examiner* — Gene W Lee
(74) *Attorney, Agent, or Firm* — Greenberg Traurig, LLP

(57) ABSTRACT

A system for controlling backlight unit capable of reducing a time difference between an image displayed on a display panel and local dimming of the backlight unit, includes a plurality of dimming control devices configured to receive an input data packet including dimming data, and control local dimming of a light source, which is included in a region assigned in advance in a backlight unit, using the dimming data, a plurality of gate lines configured to electrically connect a predetermined number of dimming control devices and configured to be sequentially driven according to a row driving method, and a micro controller unit configured to generate a gate control signal for driving the plurality of gate lines and the input data packet.

18 Claims, 11 Drawing Sheets

SYSTEM AND METHOD FOR CONTROLLING BACK LIGHT UNIT

CROSS-REFERENCE TO RELATED APPLICATIONS

This application claims the benefit of the Korean Patent Application No. 10-2021-0183618 filed on Dec. 21, 2021, which is hereby incorporated by reference as if fully set forth herein.

FIELD

The present disclosure relates to a display device, and more particularly, to a control for a backlight unit of a display device.

BACKGROUND

Liquid crystal display (LCD) devices display an image by adjusting a light transmittance of a liquid crystal. To this end, the LCD devices include an LCD panel in which liquid crystal cells are arranged in a matrix form, a driving circuit for driving the LCD panel, and a backlight unit for irradiating light to the LCD panel.

Recently, a light-emitting diode (LED) backlight unit using an LED, which has advantages of higher brightness and lower power consumption than a conventional lamp, as a light source is getting the spotlight.

As the use of a high-resolution display device such as a 4K resolution display device or an 8K resolution display device increases, the backlight unit may include a plurality of pins (or channels) for implementation of fine local dimming, and thus, the plurality of channels must be controlled at once, so that dimming data for controlling each channel is inevitably increased. Accordingly, since the high-resolution display device operates in such a manner that local dimming data is transmitted during one frame and local dimming of a previous frame is implemented in a next frame, there is a problem that a response time is longer than one frame period.

SUMMARY

The present disclosure is also directed to providing a system and method for controlling backlight unit capable of reducing a time difference between an image displayed on a display panel and local dimming of the backlight unit.

The present disclosure is also directed to providing a system and method for controlling backlight unit capable of reducing the number of channels between a micro controller unit and a dimming control device.

The present disclosure is also directed to providing a system and method for controlling backlight unit capable of increasing the number of dimming control devices connectable to one micro controller unit.

The present disclosure is also directed to providing a system for controlling backlight unit capable of determining by itself whether it is dimming data to be processed by itself, and a method thereof.

According to an aspect of the present disclosure, there is provided a system for controlling backlight unit including a plurality of dimming control devices configured to receive an input data packet including dimming data, and control local dimming of a light source, which is included in a region assigned in advance in a backlight unit, using the dimming data, a plurality of gate lines configured to electrically connect a predetermined number of dimming control devices and configured to be sequentially driven according to a row driving method, and a micro controller unit configured to generate a gate control signal for driving the plurality of gate lines and the input data packet.

According to another aspect of the present disclosure, there is provided a method for controlling backlight unit including applying a first gate control signal to a first gate line when p input data packets to be processed by p first dimming control devices are input to the first dimming control devices connected to the first gate line for each dimming control device group, controlling, by the first dimming control devices, dimming of light sources connected to the first dimming control devices using dimming data included in each of the p input data packets according to the application of the first gate control signal, applying a second gate control signal to a second gate line when p input data packets to be processed by p second dimming control devices are transmitted to the second dimming control devices connected to the second gate line for each dimming control device group; and controlling, by the second dimming control devices, dimming of light sources connected to the second dimming control devices using dimming data included in each of the p input data packets according to the application of the second gate control signal.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
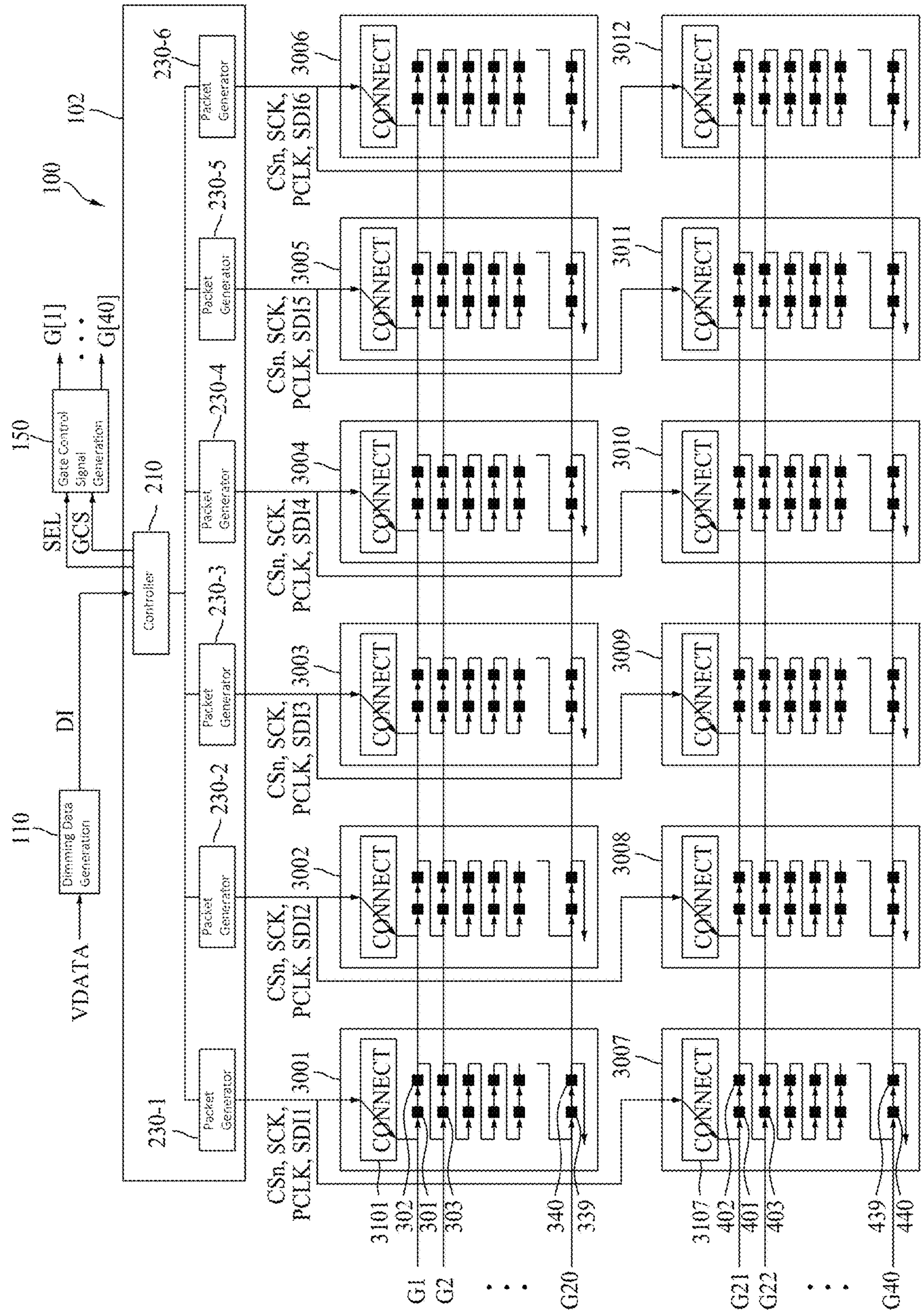
FIG. 1 is a diagram exemplarily illustrating a system for controlling backlight unit according to one embodiment of the present disclosure.

Throughout the specification, like reference numerals refer to substantially like components. In the following description, detailed descriptions of configurations and functions not related to a core configuration of the present disclosure and known in the art may be omitted. The terms used in this specification should be understood as follows.

Advantages and features of the present disclosure and implementation methods thereof will be clarified through the following embodiments described with reference to the accompanying drawings. However, the present disclosure is not limited to the embodiments described below and may be implemented with a variety of different modifications. The embodiments are merely provided to allow those skilled in the art to completely understand the scope of the present disclosure, and the present disclosure is defined only by the scope of the claims.

The figures, dimensions, ratios, angles, numbers, and the like disclosed in the drawings for describing the embodiments of the present disclosure are merely illustrative and are not limited to details shown in the present disclosure. Throughout the specification, like reference numerals refer to like components. Further, in describing the present disclosure, detailed descriptions of well-known technologies will be omitted when it is determined that they may unnecessarily obscure the gist of the present disclosure.

Terms such as "including," "having," and "composed of" used herein are intended to allow other elements to be added unless the terms are used with the term "only." Any references to the singular may include the plural unless expressly stated otherwise.

Components are interpreted as including an ordinary error range even if not expressly stated.

For the description of a temporal relationship, for example, when a temporal relationship is described as "after," "subsequently to," "next," "before," and the like, a non-consecutive case may be included unless the term "immediately" or "directly" is used in the expression.

Although the terms "first," "second," and the like may be used herein to describe various components, the components are not limited by the terms. These terms are used only to distinguish one component from another component. Therefore, a first component described below may be a second component within the technical spirit of the present disclosure.

When the term "at least one" is used, it should be understood to include all possible combinations of one or more of the associated listed items. For example, the meaning of "at least one of a first item, a second item, and a third item" may mean a combination of all items that can be presented from two or more of the first item, the second item and the third item as well as each of the first item, the second item or the third item.

The features of various embodiments of the present disclosure can be partially or entirely bonded to or combined with each other and can be interlocked and operated in technically various ways, and the embodiments can be carried out independently of or in association with each other.

Hereinafter, embodiments of the present specification will be described in detail with reference to the accompanying drawings.

FIG. 1 is a diagram exemplarily illustrating a system for controlling backlight unit according to one embodiment of the present disclosure. As shown in FIG. 1, the system for controlling backlight unit 100 (hereinafter, referred to as "backlight unit control system") includes a dimming data generation circuit 110, a micro controller unit 102, boards 3001 to 3012 on which a plurality of dimming control devices 301 to 340 and 401 to 440 are mounted, and a gate control signal generation circuit 150.

In one embodiment, each of the micro controller unit 102, the dimming control devices 301 to 340 and 401 to 440, and the gate control signal generation circuit 150 may be a semiconductor integrated circuit, a semiconductor chip, or a package in which a semiconductor integrated circuit (or the semiconductor chip) is packaged.

The backlight unit control system 100 according to the present disclosure may be used for controlling dimming of a display device or television (TV) that includes a backlight unit (BLU). At this time, the display device may be a thin-film-transistor liquid-crystal display (TFT-LCD) device or an LED display device.

In accordance with the present embodiment, a display panel included in the display device may be divided into a plurality of regions (e.g., 12 regions), and the plurality of boards 3001 to 3012 may be arranged to correspond to the respective regions of the display panel as shown in FIG. 1. Each of the boards 3001 to 3012 may be a printed circuit board (PCB).

The plurality of dimming control devices 301 to 340 are mounted on each of the boards 3001 to 3006, and the plurality of dimming control devices 401 to 440 are mounted on each of the boards 3007 to 3012. The dimming control devices 301 to 340 and 401 to 440 mounted on each of the boards 3001 to 3012 may constitute a dimming control device group. That is, when the backlight unit control system 100 includes K dimming control device groups, the backlight unit control system 100 includes K boards, and one dimming control device group is mounted for each board.

As an example, first dimming control device group mounted on the first board 3001 may include 40 dimming control devices 301 to 340. In accordance with the embodiment, p (e.g., two) dimming control devices may be disposed for each row of each of the boards 3001 to 3012. For example, as shown in FIG. 1, two dimming control devices may be disposed in each row of each board 3001 to 3012. In addition, the dimming control devices 301 to 340 may be disposed in a form of an m*p matrix in each of the boards 3001 to 3006 and the dimming control devices 401 to 440 may be disposed in the form of the m*p matrix in each of the boards 3007 to 3012, wherein m may be 20 and p may be 2.

Meanwhile, a plurality of light sources (not shown) to be controlled may be installed on each of the boards 3001 to 3012 so as to be electrically connected to the dimming control devices 301 to 340 and 401 to 440, respectively. Each of the dimming control devices 301 to 340 and 401 to 440 may control dimming of a predetermined number of light sources (e.g., six light sources). In one embodiment, the light source may be a Light Emitting Diode (LED) or an organic LED (OLED).

Hereinafter, for convenience of description, in FIG. 1, the boards 3001 to 3006 disposed at an upper end region will be referred to as a first board group and the boards 3007 to 3012 disposed at a lower end region will be referred to as a second board group. When the backlight unit control system 100 includes K boards and K dimming control device groups, the first board group and the second board group may each consist of K/2 boards.

Each of the dimming control devices 301 and 302 disposed in a first row of each of the boards 3001 to 3006 of the first board group is commonly connected to a first gate line G1, each of the dimming control devices 303 and 304 disposed in a second row of each of the boards 3001 to 3006 of the first board group is commonly connected to a second gate line G2, and each of the dimming control devices 339 and 340 disposed in a 20-th row of each of the boards 3001 to 3006 of the first board group is commonly connected to a 20-th gate line G20.

Each of the dimming control devices 401 and 402 disposed in a first row of each of the boards 3007 to 3012 of the second board group is commonly connected to a 21-st gate line G21, each of the dimming control devices 403 and 404 disposed in a second row of each of the boards 3007 to 3012 of the second board group is commonly connected to a 22-nd gate line G22, and each of the dimming control devices 439 and 440 disposed in a 20-th row of each of the boards 3007 to 3012 of the second board group is commonly connected to a 40-th gate line G40.

In accordance with the above-described embodiment, when each of the dimming control devices 301 to 340 mounted on each of the boards 3001 to 3006 and the dimming control devices 401 to 440 mounted on each of the boards 3007 to 3012 receives an input data packet including dimming data from the micro controller unit 102, dimming information corresponding to the dimming data is directly displayed through the light sources, which are controlled by the respective dimming control devices 301 to 340 and 401 to 440, by a corresponding gate control signal transmitted through the corresponding gate line. Accordingly, a variation between an image processed by the display device and the dimming information processed by the backlight unit control system 100 is less than one frame.

As each of the dimming control devices 301 to 340 and 401 to 440 connected to the gate lines G1 to G40 simultaneously operates according to the gate control signal G[1] to G[40] transmitted through each of the gate lines G1 to G40, each of the dimming control devices 301 to 340 and 401 to 440 controls local dimming of a region managed by itself. The gate control signals G[1] to G[40] transmitted through the gate lines G1 to G40 are sequentially generated and do not overlap each other.

Since the backlight unit control system 100 performs local dimming for the light sources in units of gate lines, the backlight unit control system 100 according to the present disclosure has an effect of preventing a mismatch between the image and the local dimming as compared to a conventional dimming control technique in which local dimming is performed in units of frames.

The boards 3001 and 3007 disposed in a first column are commonly connected to a first packet generator 230-1 of the micro controller unit 102, and the boards 3002 and 3008 disposed in a second column are commonly connected to a second packet generator 230-2 of the micro controller unit 102, and the boards 3006 and 3012 disposed in a sixth column are commonly connected to a sixth packet generator 230-6 of the micro controller unit 102.

For example, even when the dimming control devices 301 and 401 respectively disposed on the different boards 3001 and 3007 are connected to the first packet generator 230-1 respectively through connectors 3101 and 3107, the micro controller unit 102 may control an operation of the dimming control device 301 using a first gate control signal G[1] transmitted through the first gate line G1 and may control an operation of the dimming control device 401 using a 21-st gate control signal G[21]transmitted through the 21-st gate line G21.

Identification information (which is referred to as "ID") that may uniquely identify an i-th dimming control device disposed on each of the boards 3001 to 3012 is identical to each other. Here, i is a natural number and satisfies 1≤i≤40.

For example, the ID of the dimming control device 301 firstly disposed on each of the boards 3001 to 3006 and the ID of the dimming control device 401 firstly disposed on each of the boards 3007 to 3012 are identical to each other, and the ID of the dimming control device 340 lastly disposed on each of the boards 3001 to 3006 and the ID of the dimming control device 440 lastly disposed on each of the boards 3007 to 3012 are identical to each other.

The dimming data generation circuit 110 receives video data VDATA corresponding to RBG values from the outside, analyzes the video data VDATA, generates dimming data DI according to the analysis result, and outputs the dimming data DI to the controller 210 of the micro controller unit 102.

The micro controller unit 102 generates an input data packet SDI1 to SDI6 based on a serial peripheral interface (SPI) communication protocol based on the dimming data DI. The micro controller unit 102 includes a controller 210 and a plurality of packet generators 230-1 to 230-6. In FIG. 1, it is illustrated that the micro controller unit 102 includes six packet generators 230-1 to 230-6, but this is merely one example, and the micro controller unit 102 may also include five or less packet generators or seven or more packet generators.

As shown FIG. 1, each of the packet generators 230-1 to 230-6 outputs the input data packets SDI1 to SDI6 to the firstly disposed dimming control device 301 and 401 among the plurality of dimming control devices 301 to 340, which are mounted on each of the boards 3001 to 3006 in a daisy-chain manner, and the plurality of dimming control devices 401 to 440, which are mounted on each of the boards 3007 to 3012 in a daisy-chain manner. At this time, the data formats of each input data packet SDI1 to SDI6 may be the same, and thus, the operation of each of the dimming control devices processing each input data packet SDI1 to SDI6 is almost same.

Since one micro controller unit 102 may be connected in a daisy-chain manner to the plurality of dimming control devices 301 to 340 and 401 to 440, the number of channels for connecting between the micro controller unit 102 and the dimming control devices 301 to 340 and 401 to 440 is reduced, and a time for transmitting the input data packet SDI1 to SDI6 is reduced, so that a data processing speed is increased. In addition, the time for transmitting the input data packet SDI1 to SDI6 is reduced, and a timing margin is enhanced, so that a large number of dimming control devices 301 to 340 and 401 to 440 may be connected in a daisy-chain manner to one micro controller unit 102.

Hereinafter, a configuration of the micro controller unit 102 according to the present disclosure will be described in more detail with additional reference to FIGS. 2 and 3.

Figure 2:
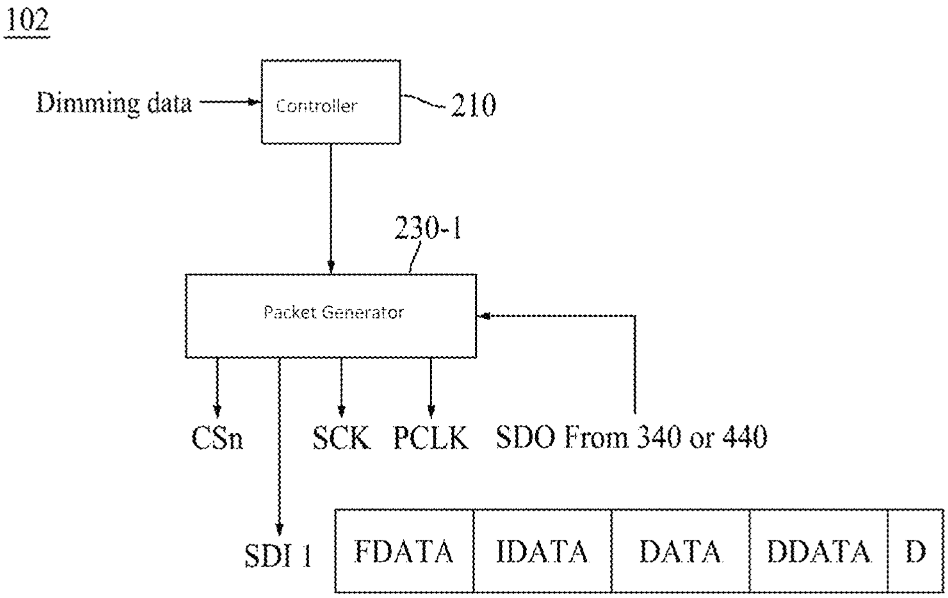
FIG. 2 is a block diagram schematically illustrating a configuration of a micro controller unit shown in FIG. 1.
Figure 3:
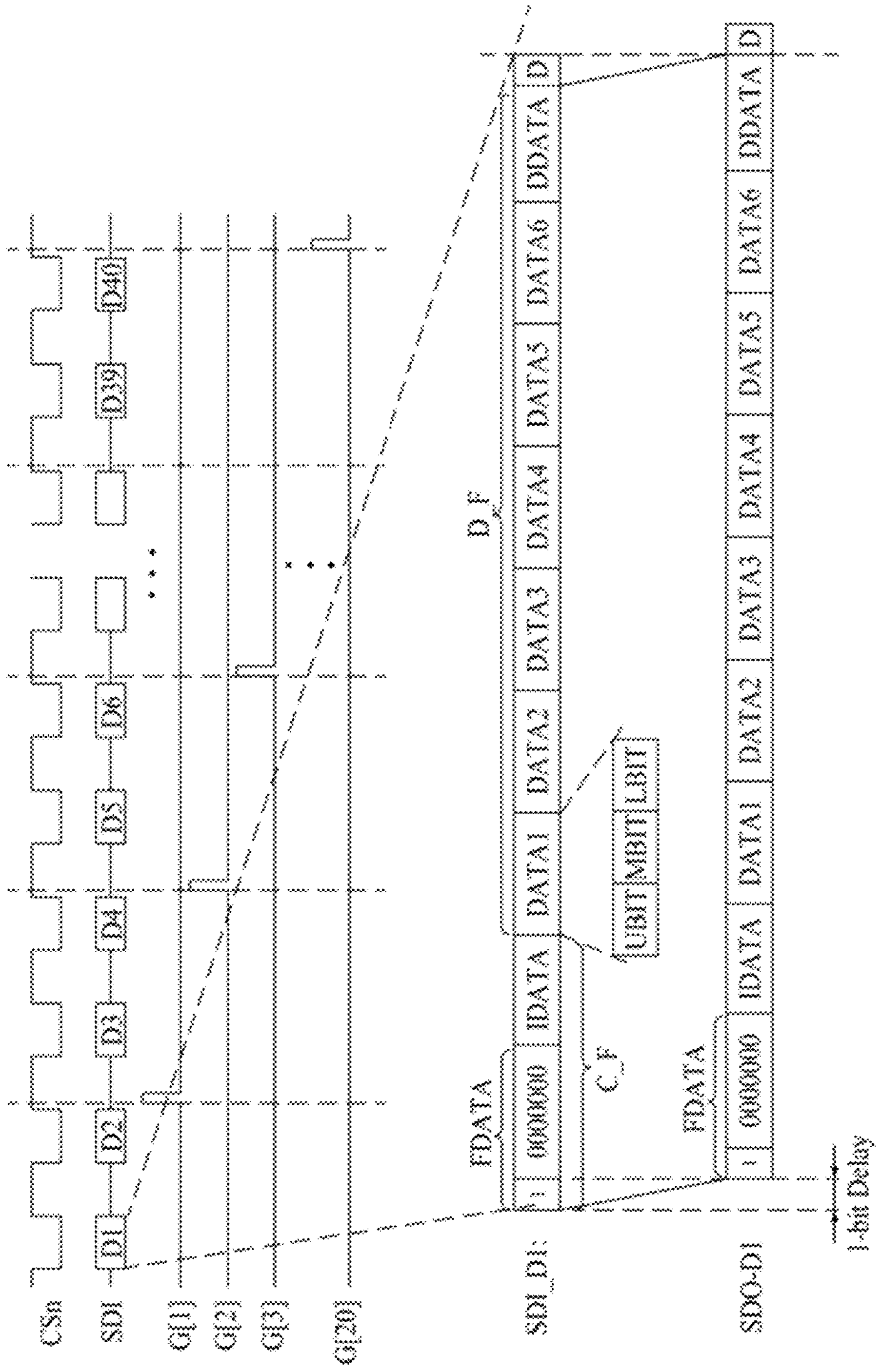
FIG. 3 is a diagram exemplarily illustrating a data format of each of an input data packet generated by the micro controller unit of FIG. 2 and an output data packet generated by delaying the input data packet by one bit.

FIG. 2 is a block diagram schematically illustrating a configuration of the micro controller unit shown in FIG. 1, and FIG. 3 is a diagram exemplarily illustrating a data format of each of the input data packet generated by the micro controller unit of FIG. 2 and the output data packet generated by delaying the input data packet by one bit.

As shown in FIGS. 1 and 2, the micro controller unit 102 to which the plurality of dimming control devices 301 to 340 and 401 to 440 are connected in a daisy-chain manner includes a controller 210 and a packet generator 230-1 to 230-6. In FIG. 2, for convenience of description, a first packet generator 230-1 connected with a connector 3101 of the board 3001 and a connector 3107 of the board 3007 is illustrated.

The controller 210 receives dimming data from the dimming data generation circuit 110. The controller 210 determines bits to be included in the input data packet SDI1 based on the dimming data so that the first packet generator 230-1 may generate the input data packet SDI1. Additionally, the controller 210 generates a selection signal SEL and a gate control signal GCS for controlling the gate lines G1 to G40, and provides the selection signal SEL and the gate control signal GCS to the gate control signal generation circuit 150.

Specifically, the controller 210 determines bits constituting first data FDATA, bits constituting second data IDATA, and bits constituting dimming data DATA, which are to be included in the input data packet SDI1. The first data FDATA includes bits for enabling a specific dimming control device to determine by itself which dimming control device it is from among the plurality of dimming control devices 301 to 340 and 401 to 440. As described below, each of the dimming control devices 301 to 340 and 401 to 440 may set identification information (ID) thereof (hereinafter, referred to as "first ID") using the bits included in the first data FDATA.

In one embodiment, a most significant bit among the bits included in the first data FDATA has a value of "1," and the first data FDATA may have a value of 80 (hex). Here, "hex" refers to hexadecimal.

The second data IDATA includes bits representing unique information (hereinafter referred to as "second ID") specifying the dimming control device, which needs to process the dimming data DATA, among the plurality of dimming control devices 301 to 340 and 401 to 440.

The dimming data DATA includes bits for controlling the local dimming of the light sources.

Meanwhile, the controller 210 may further determine bits to be included in first dummy data DDATA indicating the number of the plurality of dimming control devices 301 to 340 and 401 to 440. In one embodiment, the controller 210 may set all values of the bits to be included in the first dummy data DDATA to "0". The controller 210 further determines the bits of the first dummy data DDATA, which indicates the number of the plurality of dimming control devices 301 to 340 and 401 to 440, because although each of the plurality of dimming control devices 301 to 340 and 401 to 440 should receive all the dimming data DATA included in the input data packet SDI while a chip selection signal CSn is maintained at a low level, the chip selection signal CSn may transition to a high level in a state in which last dimming control devices 340 and 440 do not receive all of the dimming data DADA since the input data packet SDI output from the micro controller unit 102 is delayed by one bit while passing through each of the plurality of dimming control devices 301 to 340 and 401 to 440, and thus, the last dimming control devices 340 and 440 may not receive some of the dimming data DATA.

Further, the controller 210 may additionally determine a bit to be included in second dummy data D. The second dummy data D means one dummy bit that is set to safely receive the output data packet SDO before the chip selection signal CSn ends. In one embodiment, one bit of the second dummy data D may be set to "0."

The first packet generator 230-1 generates the input data packet SDI by arranging the bits determined by the controller 210 according to a serial peripheral interface (SPI) communication protocol.

The first packet generator 230-1 outputs the generated input data packet SDI to the first dimming control device 301 among the plurality of dimming control devices 301 to 340 and the first dimming control device 401 among the plurality of dimming control devices 401 to 440 connected thereto in a daisy-chain manner. The first packet generator 230-1 may output the input data packet SDI to the first dimming control devices 301 and 401 together with the chip selection signal CSn, a serial clock signal SCK, and a pulse width modulation (PWM) clock signal PCLK for dimming control.

Here, the chip selection signal CSn refers to a signal for selecting the dimming control device to be operated among the plurality of dimming control devices 301 to 340 and 401 to 440, the serial clock signal SCK refers to a clock signal used by each of the dimming control devices 301 to 340 and 401 to 440 to process the first ID, the second ID, and the dimming data, and the PWM clock signal PCLK refers to a clock signal used to generate a PWM signal for controlling dimming of the light sources.

FIG. 3 illustrates an example of the first input data packet SDI1 transmitted to the 40 dimming control devices 301 to 340 mounted on the first board 3001 by the first packet generator 230-1. Hereinafter, for convenience of description, the first input data packet SDI1 will be described as the input data packet SDI.

As shown in FIG. 3, the input data packet SDI includes a plurality of data packets D1 to D40. In this case, an i-th data packet Di included in the input data packet SDI is a data packet for adjusting brightness of six light sources connected to the i-th dimming control device.

For example, a first data packet D1 is a data packet for adjusting brightness of the six light sources connected to a first dimming control device 301, a second data packet D2 is a data packet for adjusting brightness of the six light sources connected to a second dimming control device 302, and a 40-th data packet D40 is a data packet for adjusting brightness of the six light sources connected to a 40-th dimming control device 340.

Further, when the six light sources are connected to one dimming control device, first dimming data DATA1 included in the first data packet SDI_D1 is dimming data for adjusting dimming of a first light source among the six light sources, second dimming data DATA2 is dimming data for adjusting dimming of a second light source among the six light sources, and sixth dimming data DATA6 is dimming data for adjusting dimming of a sixth light source among the six light sources.

At this time, the six light sources may be connected to each dimming control device through connection pins (not shown), and each dimming control device controls each of the six light sources using the first to sixth dimming data DATA1 to DATA6 by supplying the corresponding dimming data to the connection pin that is determined in advance according to the order in which the first to sixth dimming data DATA1 to DATA6 included in the first data packet SDI_D1 are received.

In FIG. 3, the first data packet SDI_D1 is illustrated as including six pieces of dimming data DATA1 to DATA6 because it is assumed that the first dimming control device 301 controls six light sources, but when the dimming control device 301 controls T light sources (where T is a natural number greater than or equal to 2), T pieces of dimming data DATA1 to DATAT are included in the first data packet SDI_D1.

As shown in FIG. 3, the first data packet SDI_D1, which is input to the first dimming control device 301, may include a command field C_F and a data field D_F. The command field C_F may include the first data FDATA and the second data IDATA, and the data field D_F may include the dimming data DATA. Depending on the embodiment, the data field D_F may further include the first dummy data DDATA and the second dummy data D.

The first dimming control device 301 delays the first data packet SDI_D1 by one-bit and outputs the delayed first data packet SDO_D1 to the second dimming control device 302. In FIG. 3, since a data format of each of the data packets D1 to D40 is the same, the description of the data format of the second to the 40-th data packets D2 to D40 will be omitted.

Referring to FIG. 2 again, the packet generator 230-1 receives the output data packet SDO from the 40-th dimming control devices 340 which is the last dimming control device among the plurality of dimming control devices 301 to 340 and the 40-th dimming control devices 440 which is the last dimming control device among the plurality of dimming control devices 401 to 440, and transmits the received output data packet SDO to the controller 210. The controller 210 may check whether the input data packet SDI is normally transmitted to the plurality of dimming control devices 301 to 340 and 401 to 440 by calculating delayed bits of the received output data packet SDO.

Referring to FIG. 1 again, the gate control signal generation circuit 150 may generate gate control signals G[1] to G[40] in response to a gate control signal GCS and selection signals SEL, which are output from the controller 210. For example, the gate control signal generation circuit 150 may generate gate control signals G[1] to G[20] having timings as shown in FIG. 3. For convenience of description, only the gate control signals G[1] to G[20] for a first gate line G1 to a 20-th gate line G20 are shown in FIG. 3.

For example, as shown in FIG. 3, the gate control signal generation circuit 150 generates the first gate control signal G[1] in the form of a pulse after two data packets D1 and D2 are supplied to two dimming control devices 301 and 302, generates a second gate control signal G[2] in the form of a pulse after two data packets D3 and D4 are supplied to two dimming control devices 303 and 304, and generates a 20-th gate control signal G[20] in the form of a pulse after two data packets D39 and D40 are supplied to two dimming control devices 339 and 340.

In one embodiment, the gate control signal generation circuit 150 may include a demultiplexer. For example, the demultiplexer may generate the gate control signals G[1] to G[20] having the timings shown in FIG. 3 in response to the gate control signal GCS input to an input terminal thereof and the selection signals SEL input to selection terminals. For example, the first gate control signal G[1] is supplied to the first gate line G1, and the 20-th gate control signal G[20] is supplied to the 20-th gate line G20.

Referring to FIG. 1 again, the plurality of dimming control devices 301 to 340 and 401 to 440 control local dimming of the plurality of light sources respectively connected to the corresponding dimming control devices using the input data packets SDI1 to SDI6 received from the micro controller unit 102.

In one embodiment, the plurality of dimming control devices 301 to 340 and 401 to 440 may be connected to the micro controller unit 102 in a daisy-chain manner. Specifically, the first dimming control devices 301 and 401 are connected to the micro controller unit 102 and receive the input data packet SDI from the micro controller unit 102. The first dimming control devices 301 and 401 generate an output data packet SDO delayed by one bit from the received input data packet SDI and output the output data packet SDO to the second dimming control devices 302 and 402. The second dimming control devices 302 and 402 use the output data packet SDO output from the first dimming control devices 301 and 401 as the input data packet SDI and delays the input data packet SDI again by one bit to generate the output data packet SDO, and output the output data packet SDO to the third dimming control devices 303 and 403.

As described above, according to the present disclosure, since the dimming control devices 301 to 340 and 401 to 440 output the input data packet SDI by delaying the input data packet SDI only by one bit, even when each of the boards 3001 to 3012 includes 40 dimming control devices 301 to 340 and 401 to 440, a total delay occurs only by 40-bits and thus a dimming data transmission time is reduced, so that the number of the dimming control devices connectable to the micro controller unit 102 may be increased.

Hereinafter, a configuration of the dimming control devices 301 to 340 and 401 to 440 according to the present disclosure will be described in more detail with additional reference to FIG. 4.

Figure 4:
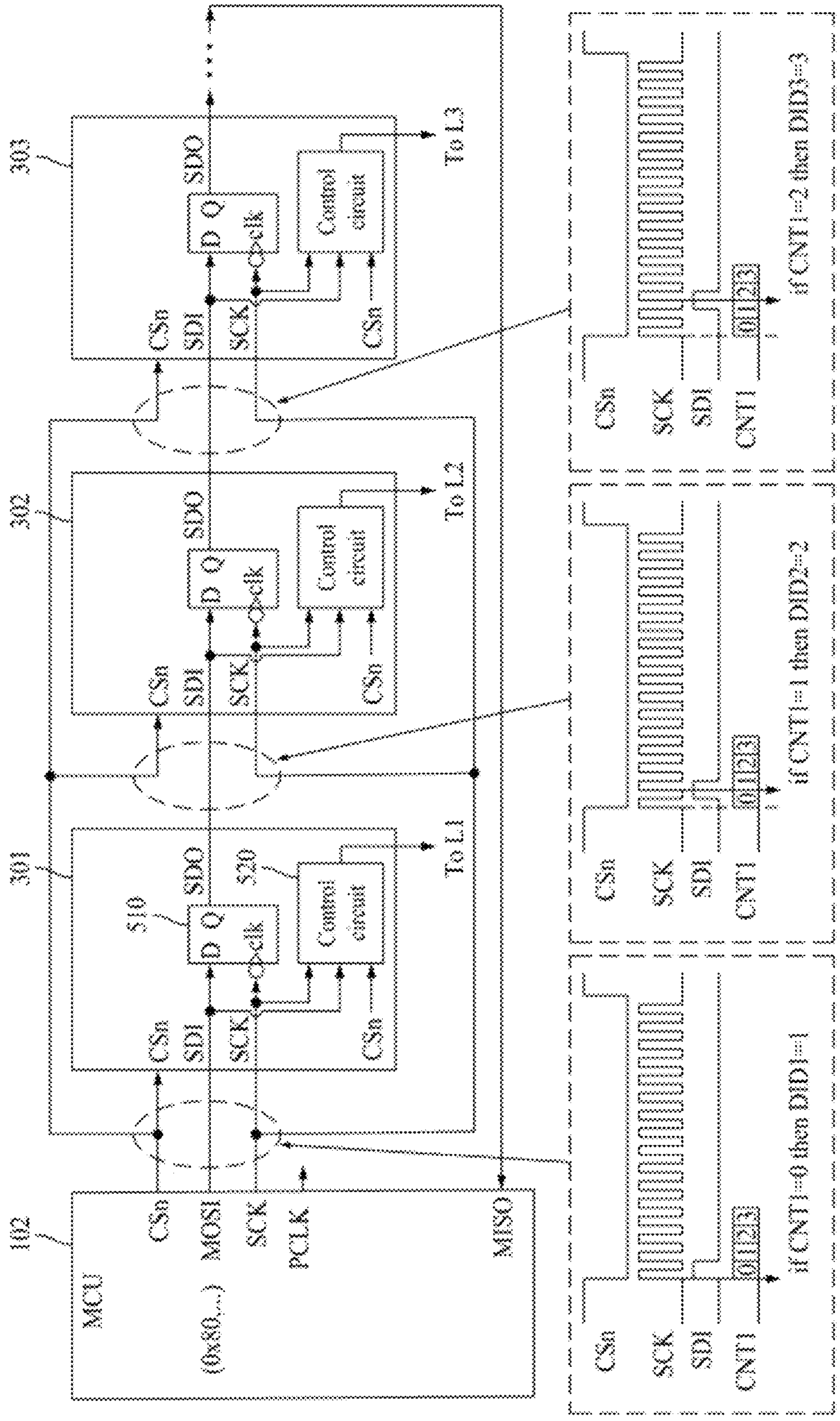
FIG. 4 is a timing diagram for describing a configuration of the dimming control devices shown in FIG. 1 and an operation of each of the dimming control devices.

FIG. 4 is a timing diagram for describing the dimming control devices shown in FIG. 1 and an operation of each of the dimming control devices. It is assumed that the structure and operation method of each dimming control device are the same, and hereinafter, for convenience of description, descriptions are made based on operations of first to third dimming control devices 301 to 303 and a reference number for the packet generator will be marked as 230.

The micro controller unit 102 transmits the chip selection signal CSn, the serial clock signal SCK, and the PWM clock signal PCLK to the first to third dimming control devices 301 to 303 connected in a daisy-chain manner to the packet generator 230. The micro controller unit 102 transmits a master output slave input MOSI to the first dimming control device 301 connected to the packet generator 230. The micro controller unit 102 receives a master input slave output MISO, which is output from the 40-th dimming control device 340, through the packet generator 230.

The master output slave input MOSI refers to the input data packet SDI transmitted to the first dimming control device 301, and the master input slave output MISO refers to the output data packet SDO transmitted from the 40-th dimming control device 340.

As shown in FIG. 4, the first dimming control device 301 includes a D-flip-flop circuit 510 and a control circuit 520.

The D-flip-flop circuit 510 captures the input data packet SDI at a second edge (e.g., a falling edge) of the serial clock signal SCK to output the output data packet SDO. A setup timing margin is improved as the D-flip-flop circuit 510 that responds to a falling edge is used.

The D-flip-flop circuit 510 outputs the output data packet SDO generated by delaying the input data packet SDI by one bit (also referred to as a one-bit time) to the second dimming control device 302.

The control circuit 520 performs a count operation in response to a first edge (e.g., a rising edge) of the serial clock signal SCK, and determines the first ID using a count value at the time at which a bit firstly having a value of "1" among the bits included in the first data FDATA is input. The control circuit 520 compares the determined first ID with the second ID included in the second data IDATA, and controls the light source L1 connected to the first dimming control device 301 using the dimming data DATA when the first ID and the second ID match and passes the dimming data DATA when the first ID and the second ID do not match.

For example, when a count value CNT1 at the time at which a bit firstly having a value of "1" among the bits (e.g., 10000000 (bin)) included in the first data FDATA of the input data packet SDI that is input to the first dimming control device 301 is input is 0 (dec) and an initial count value is 0 (dec), the first dimming control device 301 sets ID DID1 thereof to 1 (dec). Here, "bin" refers to binary, and "dec" refers to decimal.

The second dimming control device 302, which receives the output data packet SDO delayed by one bit by the D-flip-flop circuit 510 of the first dimming control device 301 as the input data packet SDI, sets ID DID2 thereof to 2 (dec) when the count value CNT1 at the time at which the bit firstly having a value of "1" among the bits included in the first data FDATA of the input data packet SDI is input, is 1 (dec) and the initial count value is 0 (dec).

The third dimming control device 303, which receives the output data packet SDO delayed by one bit by the D-flip-flop circuit of the second dimming control device 302 as the input data packet SDI, sets ID DID3 thereof to 3 (dec) when the count value CNT1 at the time at which the bit firstly having a value of "1" among the bits included in the first data FDATA of the input data packet SDI is input, is 2 (dec) and the initial count value is 0 (dec).

Each of the dimming control devices 301 to 340 and 401 to 440 determines ID DIDi thereof using a timing when the count value CNT1 at the time at which the bit firstly having a value of "1" among the bits included in the first data FDATA of the input data packet SDI is input, is detected and the initial count value Since each of the dimming control devices 301 to 340 and 401 to 440 captures the input data packet SDI at the second edge of the serial clock signal SCK to output the output data packet SDO, 40-bits delay is generated between the input data packet SDI of the first dimming control devices 301 and 401 and the output data packet SDO of the 40-th dimming control devices 340 and 340.

Figure 5:
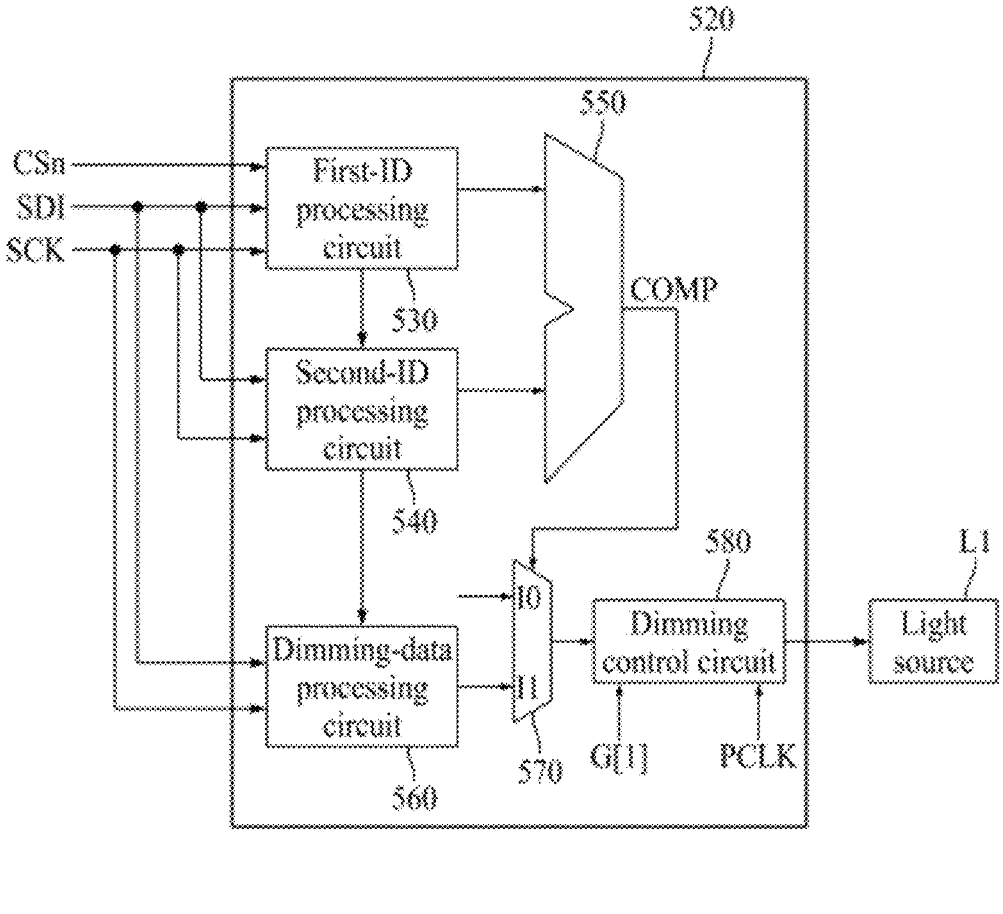
FIG. 5 is a block diagram specifically illustrating a configuration of a control circuit shown in FIG. 4.
Figure 6:
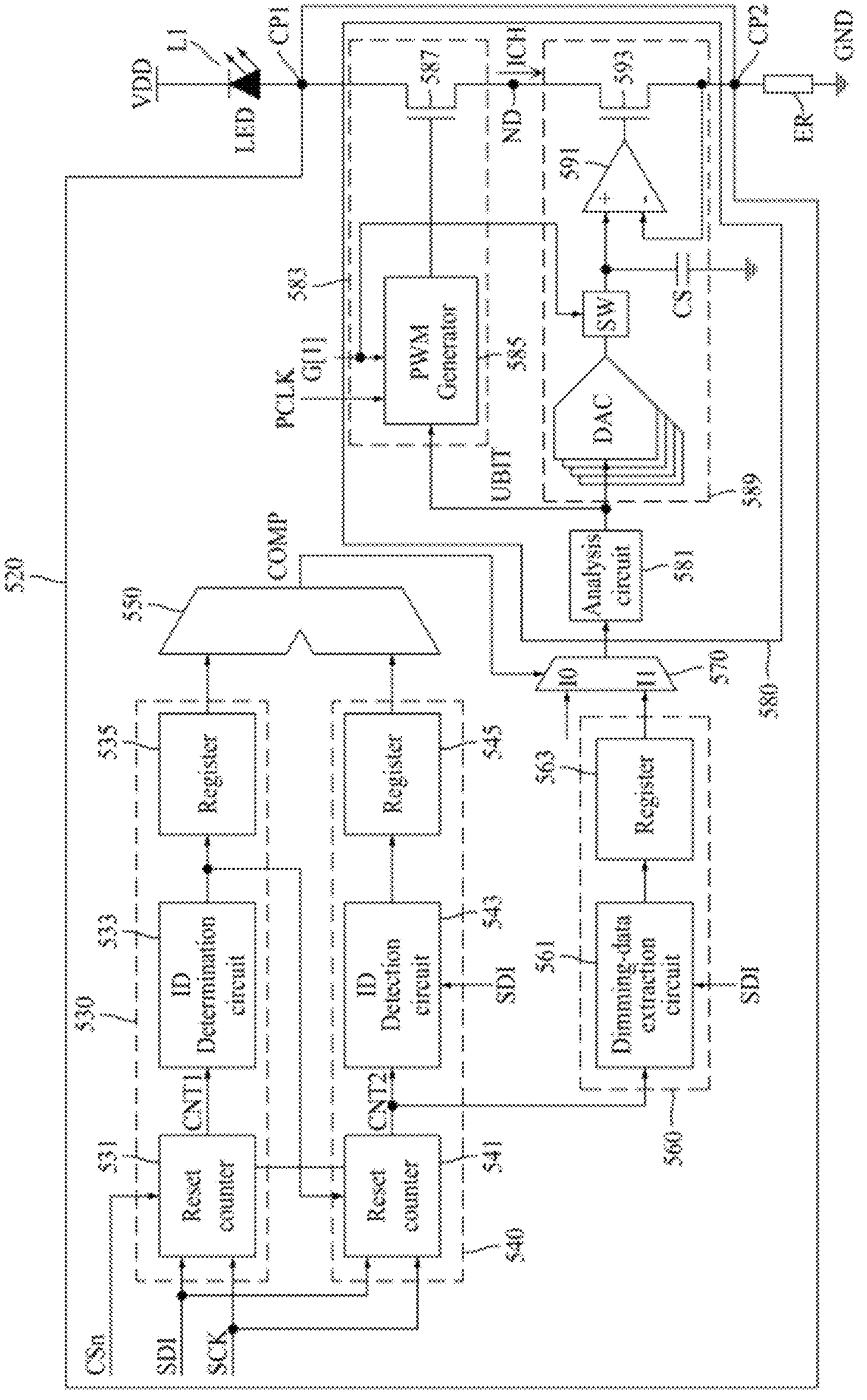
FIG. 6 is a diagram illustrating an implementation example of the control circuit shown in FIG. 5.
Figure 7:
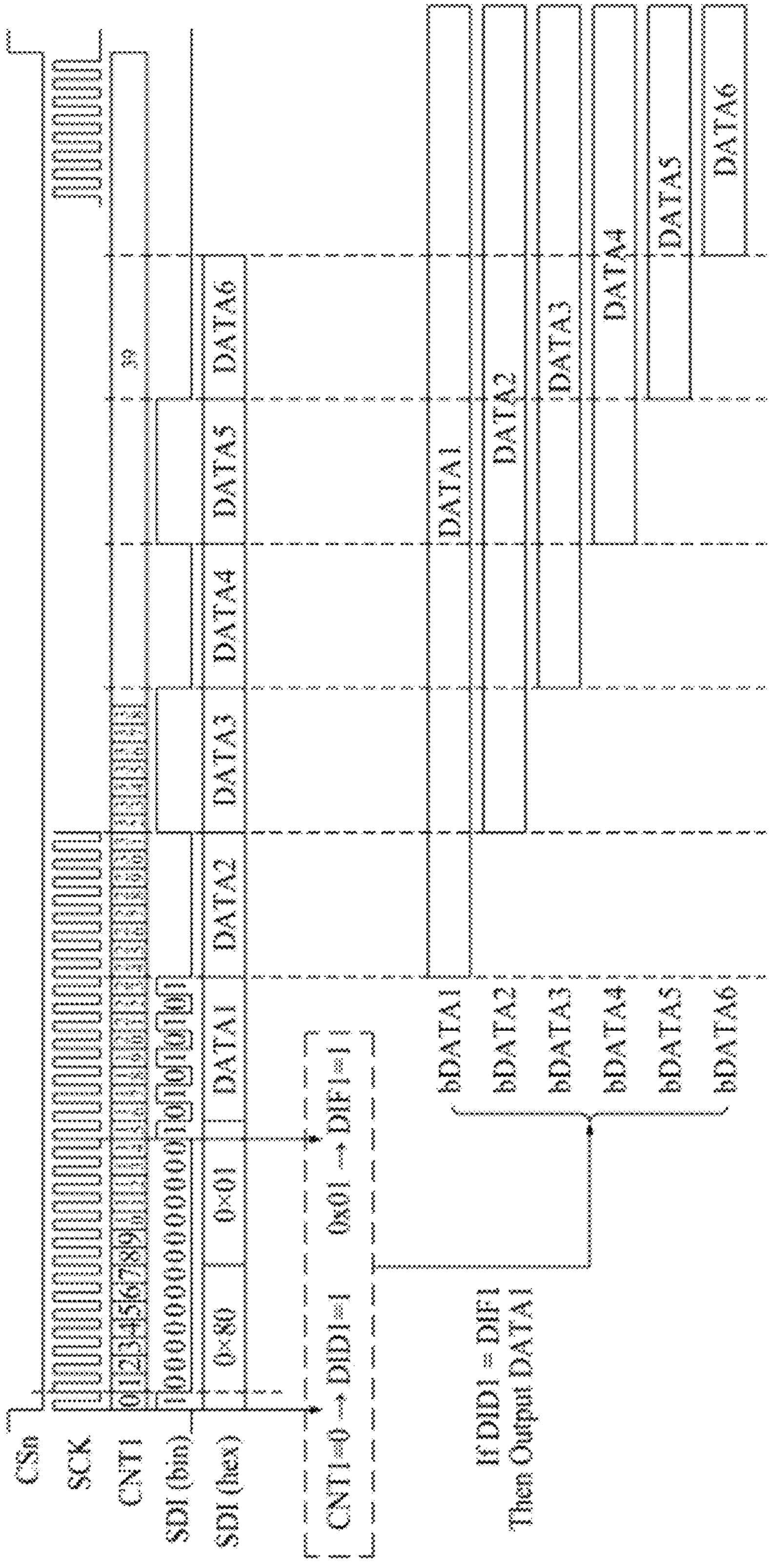
FIG. 7 is a timing diagram illustrating a data format of the input data packet generated by the micro controller unit shown in FIG. 2 and a detailed operation of the control circuit.

FIG. 5 is a block diagram of the control circuit shown in FIG. 4, FIG. 6 is a diagram illustrating an implementation example of the control circuit shown in FIG. 5, and FIG. 7 is a timing diagram illustrating a data format of the input data packet generated by the micro controller unit shown in FIG. 2 and a detailed operation of the control circuit.

Referring to FIGS. 1 to 6, the control circuit 520 includes a first-ID processing circuit 530, a second-ID processing circuit 540, a comparison circuit 550, a dimming-data processing circuit 560, a selection circuit 570, and a dimming control circuit 580.

The first-ID processing circuit 530 performs a first count operation in response to a first edge of the serial clock signal SCK. The first-ID processing circuit 530 outputs a count value at the time at which the bit firstly having a value of "1" among the bits included in the first data FDATA is input, as a first count value CNT1. The first-ID processing circuit 530 determines first ID DID1 of the first dimming control device 301 using the first count value CNT1 or the first count value CNT1 and an initial count value, and stores the first ID DID1.

To this end, as shown in FIG. 6, the first-ID processing circuit 530 may include a first counter 531, an ID determination circuit 533, and a first register 535.

The first counter 531 is reset in response to a transition of the chip selection signal CSn from a high level to a low level, and performs the first count operation in response to the first edge of the serial clock signal SCK. The first counter 531 outputs the count value at the time at which the bit firstly having a value of "1" among the bits included in the first data FDATA is input, as the first count value CNT1.

The ID determination circuit 533 uses the first count value CNT1 or the first count value CNT1 and the initial count value to determine the first ID DID1.

The first count value CNT1 shown in FIG. 7 illustrates output values of the first counter included in each of the 40 dimming control devices 301 to 340 represented in time series. In FIG. 7, for convenience of description, a case in which the dimming control devices 301 to 340 are implemented as 40 dimming control devices and the dimming data DATA includes six pieces of dimming data DATA1 to DATA6 is illustrated as an example. In FIG. 7, bDATA1 to bDATA6 refer to pieces of delayed data.

When the first data FDATA is 10000000 (bin) or 80 (hex), and the second ID included in the second data IDATA is 00000001 (bin) or 01 (hex), the first count value CNT1 of the first counter included in an i-th dimming control device among 40 dimming control devices 301 to 340 is "i−1."

For example, the first count value CNT1 of the first counter included in the first dimming control device 301 is 0 (dec), the first count value CNT1 of the first counter included in the second dimming control device 302 is 1 (dec), the first count value CNT1 of the first counter included in the third dimming control device 303 is 2 (dec), the first count value CNT1 of the first counter included in a 39-th dimming control device 339 is 38 (dec), and the first count value CNT1 of the first counter included in a 40-th dimming control device 340 is 39 (dec).

When the initial count value of the first counter included in each of the dimming control devices 301 to 340 is 0 (dec), since the ID determination circuit included in each of the dimming control devices 301 to 340 identifies the initial count value of the first counter, the ID determination circuit may determine the first ID of each of the dimming control devices 301 to 340 by adding 1 (dec) to the corresponding first count value CNT1.

Thus, the first ID of the first dimming control device 301 is 1 (dec) when the first count value CNT1 of the first counter included in the first dimming control device 301 is 0 (dec), the first ID of the second dimming control device 302 is 2 (dec) when the first count value CNT1 of the first counter included in the second dimming control device 302 is 1 (dec), the first ID of the 39-th dimming control device 339 is 39 (dec) when the first count value CNT1 of the first counter included in the 39-th dimming control device 339 is 38 (dec), and the first ID of the 40-th dimming control device 340 is 40 (dec) when the first count value CNT1 of the first counter included in the 40-th dimming control device 340 is 39 (dec).

Figure 8:
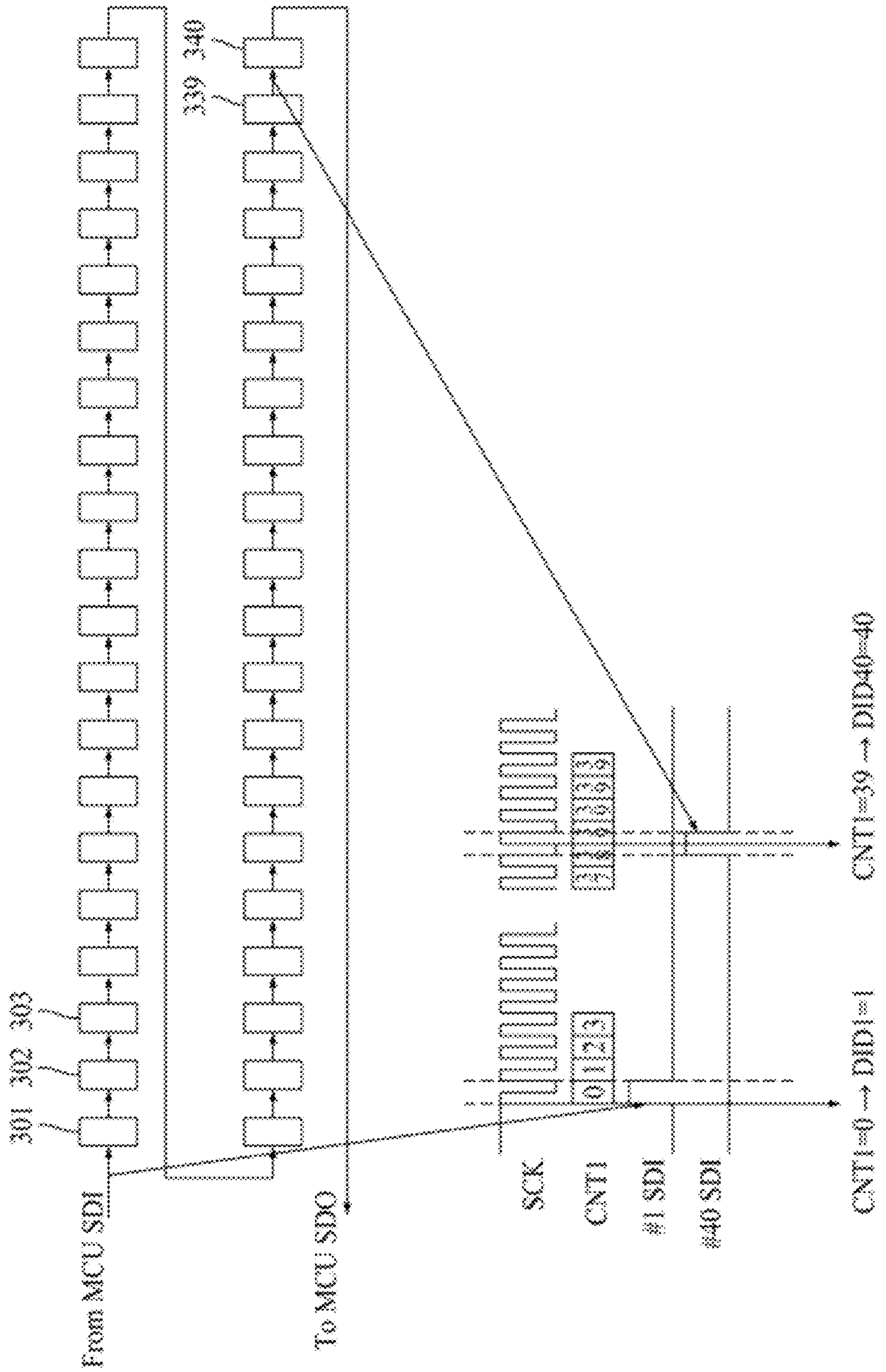
FIG. 8 is a diagram illustrating a method for each of the dimming control devices shown in FIG. 1 to calculate identification information (ID) thereof.

Specifically, referring to FIGS. 1 and 8, when the micro controller unit 102 and the plurality of dimming control devices 301 to 340 are connected in a daisy-chain manner and the first data of the input data packet SDI input to the first dimming control device 301 is 80 (hex), the first ID DID1 of the first dimming control device 301 is determined to be 1 (dec) since the first count value CNT1 of the first counter 531 of the first dimming control device 301 is 0 (dec), and first ID DID40 of the 40-th dimming control device 340 is determined to be 40 (dec) since the first count value CNT1 of the first counter of the 40-th dimming control device 340 is 39 (dec). At this time, as shown in FIGS. 7 and 8, the first count value CNT1 of the first counter of the 40-th dimming control device 340 is maintained as 39 (dec).

In another embodiment, when the initial count value of the first counter included in each of the dimming control devices 301 to 340 is 1 (dec), since the ID determination circuit included in each of the dimming control devices 301 to 340 identifies the initial count value of the first counter, the corresponding first count value CNT1 may be determined as the first ID of each of the dimming control devices 301 to 340 as it is.

For example, the first ID of the first dimming control device 301 is 1 (dec) when the first count value CNT1 of the first counter included in the first dimming control device 301 is 1 (dec), the first ID of the second dimming control device 302 is 2 (dec) when the first count value CNT1 of the first counter included in the second dimming control device 302 is 2 (dec), the first ID of the 39-th dimming control device 339 is 39 (dec) when the first count value CNT1 of the first counter included in the 39-th dimming control device 339 is 39 (dec), and the first ID of the 40-th dimming control device 340 is 40 (dec) when the first count value CNT1 of the first counter included in the 40-th dimming control device 340 is 40 (dec).

The first register 535 receives and stores the first ID DID1 determined by the ID determination circuit 533.

Referring to FIG. 5 again, the second-ID processing circuit 540 extracts second ID DIF1 from the second data IDATA, and stores the second ID DIF1.

Referring to FIG. 7, when the second ID included in the second data IDATA of the input data packet SDI is 00000001 (bin) or 01 (hex), the second-ID processing circuit included in each of the dimming control devices 301 to 340 extracts 00000001 (bin) or 01 (hex) included in the second data IDATA of the input data packet SDI, which is input to the respective dimming control devices 301 to 340, as the second ID DIF1.

To this end, as shown in FIG. 6, the second-ID processing circuit 540 may include a second counter 541, an ID detection circuit 543, and a second register 545.

The second counter 541 performs a second count operation using the first edge of the serial clock signal SCK to output a second count value CNT2.

The second counter 541 may be reset in response to an output signal of the ID determination circuit 533, and may perform the second count operation using the first edge of the serial clock signal SCK, which is input after the reset, to output the second count value CNT2.

The ID detection circuit 543 receives the input data packet SDI and the second count value CNT2, detects a start position of the second data IDATA using the second count value CNT2 and first information, and extracts the second ID DIF1 from the second data IDATA using the detection result.

The first information may include timing information about a time elapsed from when the bit firstly having a value of “1” among the bits included in the first data FDATA is detected until the second data IDATA is input.

For example, when it is assumed that the second data IDATA starts after seven cycles of the serial clock signal SCK after the bit firstly having a value of “1” among the bits included in the first data FDATA is detected, the ID detection circuit 543 may detect the start position of the second data IDATA using the second count value CNT2 and extract the second ID DIF1 from the second data IDATA using the detection result.

The second register 545 receives and stores the second ID DIF1 output from the ID detection circuit 543.

Referring to FIG. 5 again, the comparison circuit 550 compares the first ID DID1 and the second ID DIF1. In one embodiment, when each of the first ID DID1 and the second ID DIF1 is K-bits data, the comparison circuit 550 may compare the first ID DID1 and the second ID DIF1 in units of bits to generate a comparison signal COMP. Here, K is a natural number greater than or equal to two.

Since the first ID DID1 stored in the first register 535 of the first dimming control device 301 among the dimming control devices 301 to 340 is 00000001 (bin), and the second ID DIF1 stored in the second register 545 of the first dimming control device 301 is 00000001 (bin), the comparison circuit 550 outputs the comparison signal COMP having a high level.

However, since the first ID stored in the first register of the i-th dimming control device (where 2≤i≤N) except for the first dimming control device 301 among the dimming control devices 301 to 340 and the second ID (=00000001 (bin)) stored in the second register of the i-th dimming control device do not match, the comparison circuit 550 of the i-th dimming control device outputs the comparison signal having a low level.

For example, the first ID (=00000010 (bin) or 00000011 (bin)) stored in the first register of the second dimming control device 302 or the third dimming control device 303 and the second ID (=00000001 (bin)) stored in the second register of the second dimming control device 302 or the third dimming control device 303 do not match, the comparison circuit of the second dimming control device 302 or the third dimming control device 303 outputs the comparison signal having a low level.

The dimming-data processing circuit 560 extracts the dimming data DATA from the input data packet SDI and stores the dimming data DATA. To this end, as shown in FIG. 6, the dimming-data processing circuit 560 may include a dimming-data extraction circuit 561 and a third register 563.

The dimming-data extraction circuit 561 receives the input data packet SDI and the second count value CNT2, detects a start position of the dimming data DATA using the second count value CNT2 and second information, and extracts the dimming data DATA using the detection result.

The second information may include timing information about a time elapsed from when the bit firstly having a value of “1” among the bits included in the first data FDATA is detected until the dimming data DATA is input.

For example, when it is assumed that the dimming data DATA starts after 15 cycles of the serial clock signal SCK after the bit firstly having a value of “1” among the bits included in the first data FDATA is detected, the dimming-data extraction circuit 561 may detect the start position of the dimming data DATA using the second count value CNT2 and extract the dimming data DATA using the detection result.

The third register 563 receives and stores the dimming data DATA output from the dimming-data extraction circuit 561. Each of the first to third registers 535, 545, and 563 is an example of a data storage device.

Referring to FIG. 5 again, in response to the comparison signal COMP output from the comparison circuit 550, the selection circuit 570 outputs one of dummy data corresponding to a first voltage (e.g., the ground voltage) input through a first input terminal thereof and the dimming data DATA input through a second input terminal thereof to the dimming control circuit 580.

Depending on the embodiment, the selection circuit 570 may be replaced with a switch that outputs the dimming data DATA output from the third register 563 to the dimming control circuit 580 in response to the comparison signal COMP having a high level output from the comparison circuit 550.

The dimming control circuit 580 controls dimming of a light source L1 based on the dimming data DATA output from the selection circuit 570. In one embodiment, the dimming control circuit 580 may control the dimming of the light source L1 by the PWM driving method. In another embodiment, the dimming control circuit 580 may control the dimming of the light source L1 by the linear driving method using an analog signal generated based on the dimming data DATA.

In still another embodiment, the dimming control circuit 580 may analyze a grayscale value of the dimming data DATA and perform a hybrid dimming control for controlling the dimming of the light source L1 by selecting one of a PWM driving method or a linear driving method according to the grayscale value. Specifically, the dimming control circuit 580 may control the dimming of the light source L1 by the PWM driving method when the dimming data DATA is low-grayscale data, and control the dimming of the light source L1 by the linear driving method when the dimming data DATA is high-grayscale data.

Figure 9:
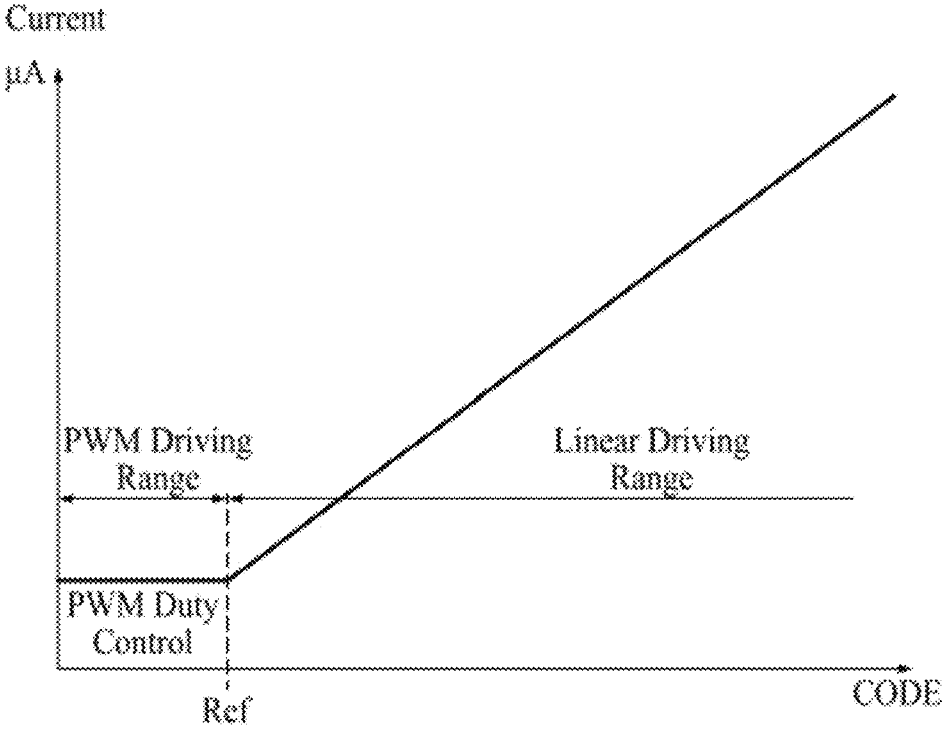
FIG. 9 is a schematic diagram for describing a hybrid dimming control according to one embodiment of the present disclosure.

FIG. 9 conceptually illustrates a method in which the dimming control circuit 580 according to the present disclosure controls the dimming of the light source L1 by a hybrid dimming control method. Referring to FIG. 9, when a first value corresponding to bits CODE included in the dimming data DATA is less than or equal to a second value corresponding to reference bits Ref, the dimming control circuit 580 determines that the dimming data DATA is the low-grayscale data and adjusts the dimming (or brightness) of the light source L1 by the PWM driving method. In addition, when the first value is greater than the second value, the dimming control circuit 580 determines that the dimming data DATA is the high-grayscale data, and adjusts the dimming (or brightness) of the light source L1 by the linear driving method.

In one embodiment, as shown in FIG. 3, when the dimming data is composed of a first bit group UBIT composed of bits including a high-order bit (for example, most significant bit MSB), a second bit group LBIT composed of bits including a low-order bit (for example, least significant bit LSB), and a third bit group MBIT composed of bits excluding the first bit group UBIT and the second bit group LBIT, the dimming control circuit 580 may determine whether the dimming data DATA is the low-grayscale data or high-grayscale data by determining whether at least one bit having a value of "1" is present in the third bit group MBIT of the dimming data DATA.

For example, when the dimming data DATA is 0001000000100000 (bin) and the third bit group MBIT is 000000 (bin), the dimming control circuit 580 may determine that the dimming data DATA is the low-grayscale data because none of the bits having a value of "1" are included in the third bit group MBIT (=000000). When the dimming control circuit 580 determines that the dimming data DATA is the low-grayscale data, the dimming control circuit 580 controls the dimming of the light source L1 by the PWM driving method using the first bit group UBIT among the dimming data DATA.

As another example, when the dimming data DATA is 0000000001000001 (bin) or 65 (dec) and the third bit group MBIT is 000001 (bin), the dimming control circuit 580 may determine that the dimming data DATA is the high-grayscale data because one bit having a value of "1" is included in the third bit group MBIT (=000001). When the dimming control circuit 580 determines that the dimming data DATA is the high-grayscale data, the dimming control circuit 580 controls the dimming of the light source L1 using an analog signal generated using both the third bit group MBIT and the second bit group LBIT among the dimming data DATA.

In the above described embodiment, as shown in FIG. 6, the dimming control circuit 580 according to the present disclosure may include an analysis circuit 581, a PWM dimming control circuit 583, and a linear dimming control circuit 589.

The analysis circuit 581 analyzes the dimming data DATA to determine whether the dimming data DATA is the low-grayscale data or high-grayscale data. Specifically, the analysis circuit 581 may determine whether the dimming data DATA is the low-grayscale data or high-grayscale data by determining whether at least one bit having a value of "1" is present in the third bit group MBIT of the dimming data DATA.

1. When Dimming Data DATA is Low-Grayscale Data

For example, when the dimming data DATA is 0001000000100000 (bin) and the third bit group MBIT is 000000 (bin), the analysis circuit 581 determines that the dimming data DATA is the low-grayscale data because none of the bits having a value of "1" are included in the third bit group MBIT (=000000).

An operation of the dimming control circuit 580 will be described with reference to FIGS. 6 and 10 when the dimming data DATA is the low-grayscale data.

When the dimming data DATA is the low-grayscale data, the analysis circuit 581 outputs the first bit group UBIT (=M[3:0]=1) of the dimming data DATA to the PWM dimming control circuit 583, and outputs reference data of 000000111111 (bin) to the linear dimming control circuit 589.

Figure 10:
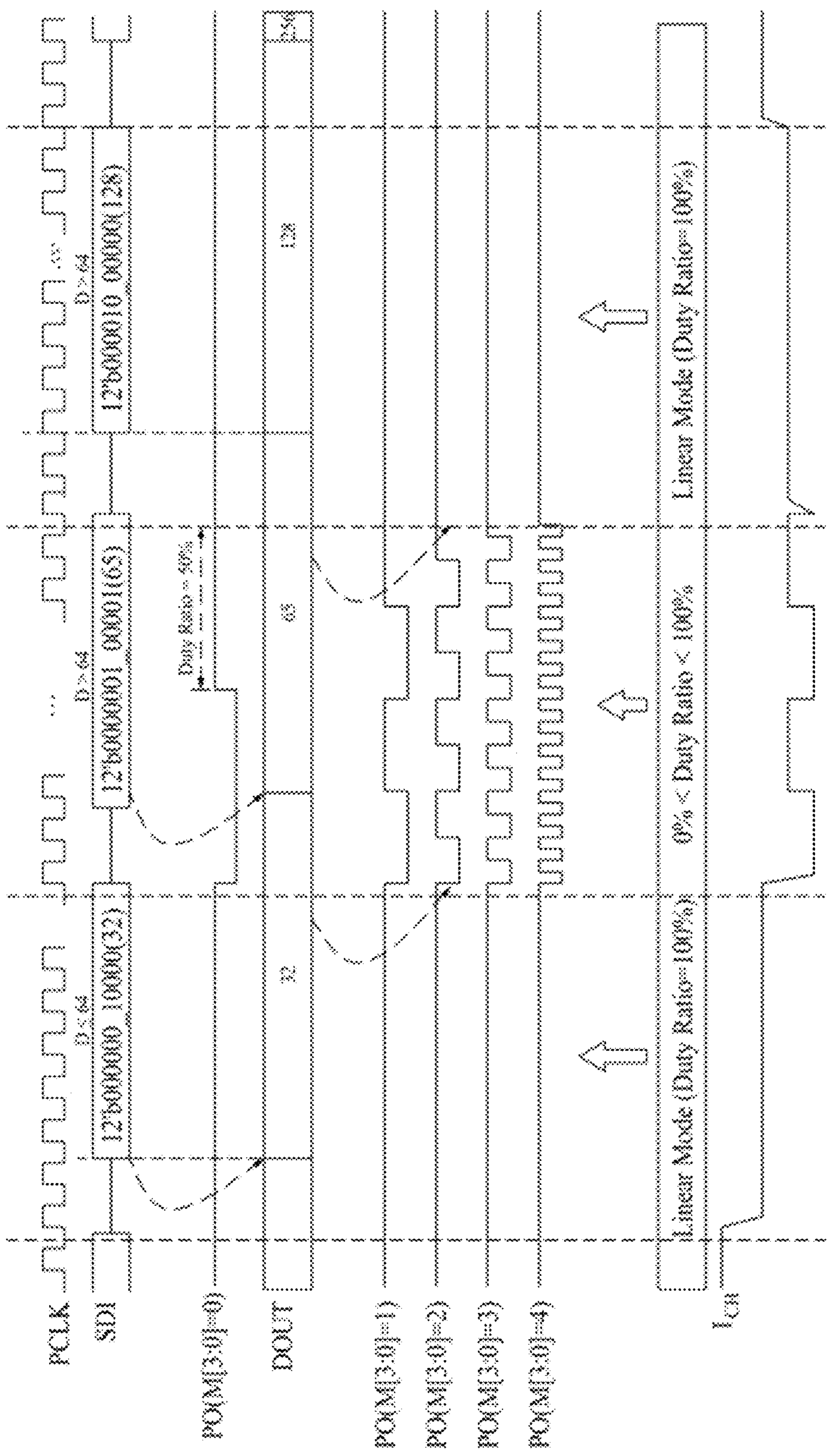
FIG. 10 a diagram illustrating an operation timing of a dimming control circuit according to one embodiment of the present disclosure.

The PWM dimming control circuit 583 generates a PWM signal PO(M[3:0]=1) as shown in FIG. 10 using the PWM clock signal PCLK, which is output from the micro controller unit 102, and the first bit group UBIT (=M[3:0]=0001) of the dimming data DATA (=0001000000100000 (bin)), and controls the dimming of the light source L1 in response to the PWM signal PO(M[3:0]=1).

The light source L1 may include an LED connected between a power line, through which an operating voltage VDD is supplied, and a first connection terminal CP1 and a resistor ER connected between a second connection terminal CP2 and the ground GND. The resistor ER serves to adjust a current $I_{CH}$ flowing through a current path formed by the operating voltage VDD, transistors 587 and 593, and the resistor ER.

The PWM dimming control circuit 583 includes a PWM signal generator 585 and a first transistor 587.

The PWM signal generator 585 may generate the PWM signal PO([3:0]=0), PO([3:0]=1), PO([3:0]=2), PO([3:0]=3), or PO([3:0]=4) whose waveform and duty ratio are determined according to the first bit group UBIT (=M[3:0]) of the dimming data DATA.

The duty ratio of the PWM signal PO([3:0]=0), PO([3:0]=1), PO([3:0]=2), PO([3:0]=3), or PO([3:0]=4) may be greater than 0% and less than 100%.

The PWM signal generator 585 generates the PWM signal PO(M[3:0]=1) as shown in FIG. 10 using the PWM clock signal PCLK and the first bit group UBIT (=M[3:0]=1) of the dimming data DATA, and outputs the PWM signal PO(M[3:0]=1) to a control terminal (e.g., a gate) of the first transistor 587. At this time, as shown in FIG. 6, the PWM signal generator 585 may additionally use a first gate control signal G[1] to generate the PWM signal.

For example, the PWM signal generator 585 generates the PWM signal PO(M[3:0]=0) as shown in FIG. 10 when the first bit group UBIT (=M[3:0]=0) is 0000 (bin), generates the PWM signal PO(M[3:0]=2) as shown in FIG. 10 when the first bit group UBIT (=M[3:0]=2) is 0010 (bin), generates the PWM signal PO(M[3:0]=3) as shown in FIG. 10 when the first bit group UBIT (=M[3:0]=3) is 0011 (bin), and generates the PWM signal PO(M[3:0]=4) as shown in FIG. 10 when the first bit group UBIT (=M[3:0]=4) is 0100 (bin).

The first transistor 587 controls a connection between the first connection terminal CP1 and an intermediate node ND in response to the output signal PO(M[3:0]=1) of the PWM signal generator 585.

The linear dimming control circuit 589 controls the dimming of the light source L1 using an analog signal DOUT generated using the reference data of 000000111111 (bin).

The linear dimming control circuit 589 includes a digital-to-analog converter DAC, a switch SW, a capacitor CS, an amplifier circuit 591, and a second transistor 593. Each of the transistors 587 and 593 may be a power field-effect transistor (FET) and may be an n-type metal oxide semiconductor FET (nMOSFET).

The digital-to-analog converter DAC converts the reference data of 000000111111 (bin) output from the analysis circuit 581 into an analog signal.

The switch SW controls a connection between an output terminal of the digital-to-analog converter DAC and a first input terminal (e.g., a (+) input terminal) of the amplifier circuit 591 in response to the first gate control signal G[1].

The capacitor CS is connected between the first input terminal of the amplifier circuit 591 and the ground and charges electric charges corresponding to the analog signal corresponding to the reference data of 000000111111 (bin).

A second input terminal (e.g., (–) input terminal) of the amplifier circuit 591 is connected to an output terminal of the amplifier circuit 591, amplifies a difference between a voltage charged in the capacitor CS and an output voltage of the amplifier circuit 591, and outputs the amplified result to a control terminal (e.g., a gate) of the second transistor 593.

The second transistor 593 controls a connection between the intermediate node ND and the second connection terminal CP2 in response to the output signal of the amplifier circuit 591.

Accordingly, since the first transistor 587 adjusts the amount of the current $I_{CH}$ flowing through the first transistor 587 in response to a signal corresponding to the first bit group UBIT (=M[3:0]) of the dimming data DATA, the dimming of the LED included in the light source L1 is adjusted.

2. When Dimming Data DATA is High-Grayscale Data

For example, when the dimming data DATA is 0000000001000001 (bin) or 65 (dec), and the third bit group MBIT is 000001 (bin), the analysis circuit 581 may determine that the dimming data DATA is the high-grayscale data because one bit having a value of "1" is included in the third bit group MBIT (=000001).

An operation of the dimming control circuit 580 when the dimming data DATA is the high-grayscale data will be described with reference to FIGS. 6 and 10.

When the dimming data DATA is the high-grayscale data, the analysis circuit 581 outputs the first bit group UBIT (=M[3:0]=0) of the dimming data DATA to the PWM dimming control circuit 583, and outputs data of 00001000001 (bin) including the third bit group MBIT and the second bit group LBIT among the dimming data DATA to the linear dimming control circuit 589.

The PWM signal generator 585 generates the PWM signal PO(M[3:0]=0) as shown in FIG. 10 using the PWM clock signal PCLK output from the micro controller unit 102, the first gate control signal G[1], and the first bit group UBIT (=M[3:0]=0000) of the dimming data DATA and outputs the PWM signal PO(M[3:0]=0) to the control terminal of the first transistor 587. At this time, the PWM signal PO(M[3:0]=0) has a duty ratio of 100%.

The linear dimming control circuit 589 controls the dimming of the light source L1 using an analog signal corresponding to the data of 00001000001 (bin) including the third bit group MBIT and the second bit group LBIT among the dimming data DATA.

The digital-to-analog converter DAC converts the data of 00001000001 (bin) including the third bit group MBIT and the second bit group LBIT into an analog signal.

The switch SW, which is turned on in response to the first gate control signal G[1], outputs the analog signal DOUT of the digital-to-analog converter DAC to the first input terminal of the amplifier circuit 591, so that the capacitor CS charges electric charges corresponding to the analog signal DOUT.

The amplifier circuit 591 amplifies the difference between the voltage charged in the capacitor CS and the output voltage of the amplifier circuit 591 and outputs the amplified result to the control terminal of the second transistor 593. Accordingly, the second transistor 593 adjusts the amount of the current $I_{CH}$ flowing through the second transistor 593 in response to the signal corresponding to the data of 00001000001 (bin), so that the dimming of the LED included in the light source L1 is adjusted.

When the dimming data DATA is 0000000010000000 (bin) or 128 (dec), and the third bit group MBIT is 000010 (bin), the analysis circuit 581 may determine that the dimming data DATA is the high-grayscale data because one bit having a value of "1" is included in the third bit group MBIT (=000010). Since a process of processing the dimming data DATA determined to be the high grayscale data by the dimming control circuit 580 is similar to that described above, a detailed description thereof will be omitted.

Figure 11:
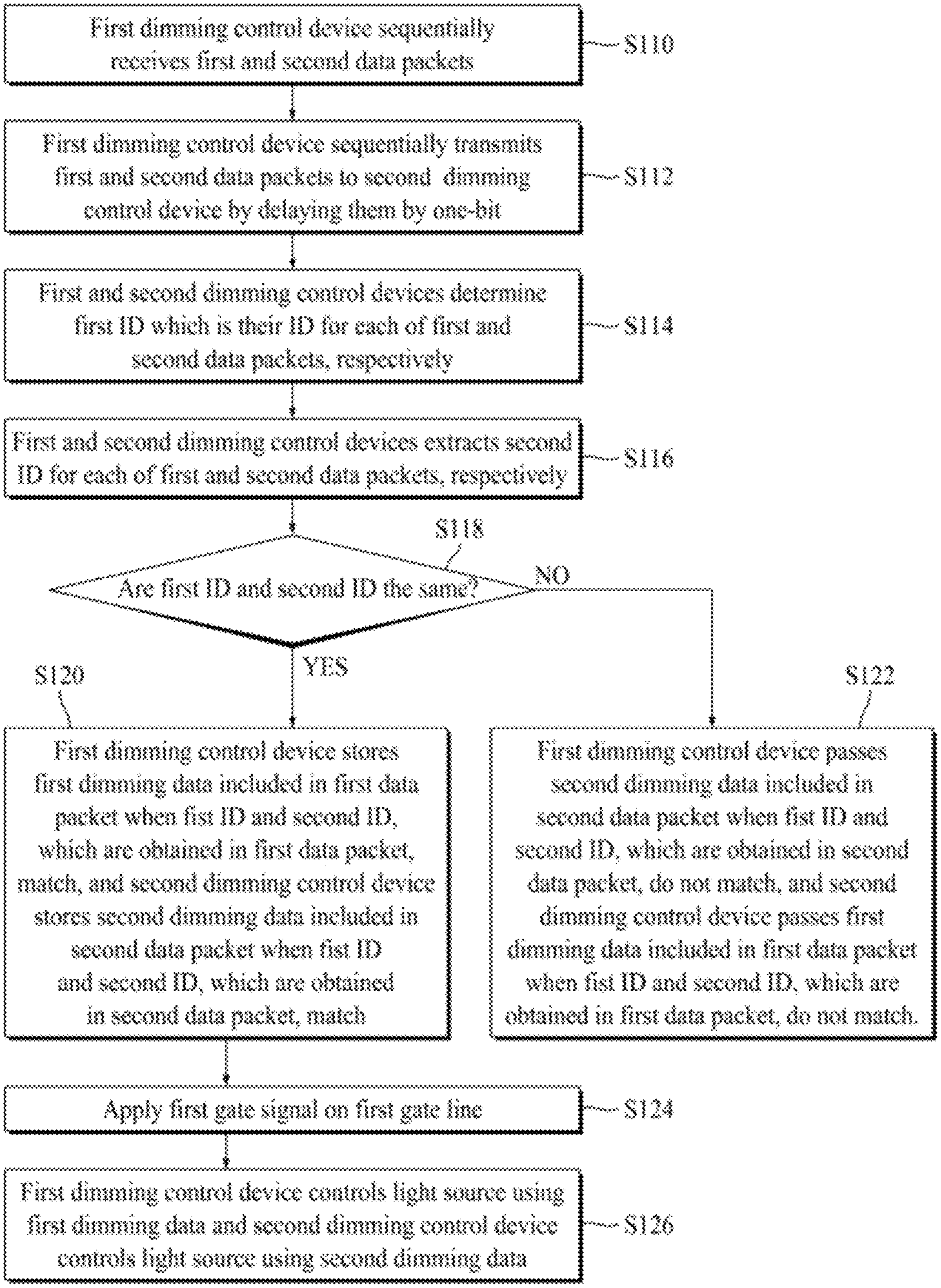
FIG. 11 is a flowchart illustrating a method for controlling backlight unit according to one embodiment of the present disclosure.

Hereinafter, a dimming control method according to the present disclosure will be described with reference to FIG. 11. FIG. 11 is a flowchart illustrating a dimming control method according to one embodiment of the present disclosure. Since the plurality of gate lines G1 to G40 according to the present disclosure operate in a row sequential driving method, the dimming control method according to the present disclosure may be equally applied to all gate lines G1 to G40. Thus, the dimming control method according to the present disclosure will be described below with reference to the first and second dimming control devices 301 and 302 connected to the first gate line G1.

Additionally, it is assumed that the first data packet D1 is a data packet containing first dimming data to be processed by the first dimming control device 301, and the second data packet D2 is a data packet containing second dimming data to be processed by the second dimming control device 302.

The first dimming control device 301 connected to the micro controller unit 102 sequentially receives the first and second data packets D1 and D2 from the micro controller unit 102 according to a timing of the chip selection signal CSn (S110).

In one embodiment, the first dimming control device 301 receives the first data packet D1 when a level of the chip selection signal CSn transitions from a high level to a low level, the first dimming control device 301 waits until the level of the chip selection signal CSn transitions from the high level to a low level when the level of the chip selection signal CSn transitions from the low level to the high level. The first dimming control device 301 receives the second data packet D2 when a level of the chip selection signal CSn again transitions from the high level to the low level, and the first dimming control device 301 waits until the level of the chip selection signal CSn transitions from the high level to a low level when the level of the chip selection signal CSn again transitions from the low level to the high level.

Thereafter, the first dimming control device 301 sequentially transmits the first and second data packets D1 and D2 to the second dimming control device 302 by delaying the first and second data packets D1 and D2 by one-bit (S112). In one embodiment, the first dimming control device 301 may delay the first and second packets D1 and D2 by one-bit using a D-flip-flop included therein.

Thereafter, the first and second dimming control devices 301 and 302 determine a first ID which is their ID for each of the first and second data packets D1 and D2, respectively (S114). Specifically, the first and second dimming control devices 301 and 302 may determine the first ID using a count value at the time at which a bit firstly having a value of "1" among the bits included in the first data FDATA of each of the first data packet D1 and the second packet D2 is input whenever the first and second data packets D1 and D2 are input.

Thereafter, the first and second dimming control devices 301 and 302 extracts the second ID for each of the first and second data packets D1 and D2, respectively (S116), and then compare the first ID and the second ID for each of the first and second data packets D1 and D2 (S118). At this time, the first and second data packets D1 and D2 may be extracted from a second data IDATA of the first and second data packets D1 and D2, respectively.

As a result of the comparison, the first dimming control device 301 stores the first dimming data included in the first data packet D1 when the first ID and the second ID, which are obtained in the first data packet D1, match, and the second dimming control device 302 stores the second dimming data included in the second data packet D2 when the first ID and the second ID, which are obtained in the second data packet D2, match (S120).

On the other hand, the first dimming control device 301 passes the second dimming data included in the second data packet D2 because the first ID and the second ID, which are obtained in the second data packet D2, do not match, and the second dimming control device 302 passes the first dimming data included in the first data packet D1 because the first ID and the second ID, which are obtained in the first data packet D1, do no match (S122).

Thereafter, when a first gate control signal G[1] is applied on a first gate line G1 (S124), the first dimming control device 301 controls dimming of the light source L1 connected to the first dimming control device 301 using the stored first dimming data and the second dimming control device 302 controls dimming of the light source L2 connected to the second dimming control device 302 using the stored second dimming data (S126).

In accordance with the above-described embodiment, when i dimming control devices connected to one gate line for each dimming control device group receive the input data packet including dimming data, dimming information corresponding to the dimming data is directly displayed through the light sources, which are controlled by the i dimming control devices, by a corresponding gate control signal transmitted through the corresponding gate line. Accordingly, a variation between an image processed by the display device and the dimming information processed by the backlight unit control system 100 is less than one frame.

It should be understood by those skilled in the art that the present disclosure can be implemented in other specific forms without changing the technical concept and essential features of the present disclosure.

Further, the methods described herein may be implemented, at least in part, using one or more computer programs or components. The components may be provided as a series of computer instructions on a computer readable medium or machine readable medium, including a volatile or non-volatile memory. The instructions may be provided as software or firmware, and may, in whole or in part, be implemented in a hardware configuration such as application-specific integrated circuits (ASICs), field-programmable gate arrays (FPGAs), digital signal processors (DSPs), or other similar devices. The instructions may be configured to be executed by one or more processors or other hardware configurations, and the processor or other hardware components may perform all or part of the methods and procedures disclosed herein when executing the series of computer instructions.

According to the present disclosure, local dimming is performed on a backlight unit in units of gate lines, so that a time difference between an image displayed on a display panel and the local dimming of the backlight unit can be reduced to be less than one frame period, thereby preventing a mismatch between the image and the local dimming.

Further, according to the present disclosure, a micro controller unit and a plurality of dimming control devices are connected in a daisy-chain manner so that the number of channels between the micro controller unit and the plurality of dimming control devices can be reduced, and a time for transmitting an input data packet to the dimming control devices from the micro controller unit decreases so that local dimming for light sources can be quickly performed and response time can improve.

Further, according to the present disclosure, one micro controller unit is connected in a daisy-chain manner to a plurality of dimming control devices, and an output data packet of each of the dimming control devices is delayed by one bit from an input data packet, so that an overall delay time generated by the plurality of dimming control devices can be reduced, and a timing margin can be improved, thereby increasing the number of the dimming control devices connectable to one micro controller unit.

Further, according to the present disclosure, each of dimming control devices can set ID thereof using bits included in first data of an input data packet only by transmitting the input data packet once without transmitting a separate command for setting the ID, so that each of the dimming control devices can determine by itself whether dimming data transmitted from a micro controller unit is dimming data to be processed by itself based on the set ID.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A system for controlling backlight unit comprising:

a plurality of dimming control devices configured to receive an input data packet including dimming data, and control local dimming of a light source, which is included in a region assigned in advance in a backlight unit, using the dimming data;

a plurality of gate lines configured to electrically connect a predetermined number of dimming control devices and configured to be sequentially driven according to a row driving method; and a micro controller unit configured to generate a gate control signal for driving the plurality of gate lines and the input data packet, wherein the plurality of dimming control devices are grouped into N units to form K dimming control device groups, wherein N dimming control devices included in one dimming control device group are connected in a daisy-chain manner to the micro controller unit, wherein one gate line electrically connects p dimming control devices for each dimming control device group, and wherein the p dimming control devices connected to the one gate line for each dimming control device group simultaneously operate.

2. The system of claim 1, further comprising a gate control signal generation circuit configured to divide the gate control signal by the number of the gate lines and sequentially output the divided gate control signal to each of the gate lines.

3. The system of claim 2, wherein the micro controller unit further generates a selection signal, and the gate control signal generation circuit sequentially outputs the divided gate control signal to each gate line in response to the selection signal.

4. The system of claim 1, wherein, when the gate control signal is applied to the one gate line after p input data packets are input to the p dimming control devices for each dimming control device group, all of the dimming control devices connected to the one gate line simultaneously operate to control the local dimming of the light source.

5. The system of claim 1, wherein the N dimming control devices included in each dimming control device group are mounted on one board, and K/2 boards, on which K/2 dimming control device groups among the K dimming control device groups are mounted, are disposed in parallel in a horizontal direction in an upper end region, and K/2 boards, on which remaining K/2 dimming control device groups among the K dimming control device groups are mounted, are disposed in parallel in the horizontal direction in a lower end region, and thus K boards are arranged in a matrix form.

6. The system of claim 5, wherein an m-th dimming control device group among the K/2 dimming control device groups disposed in the upper end region and an m-th dimming control device group among the K/2 dimming control device groups disposed in the lower end region are connected to one packet generator included in the micro controller unit.

7. The system of claim 1, wherein the micro controller unit generates the input data packet using the dimming data according to a serial peripheral interface (SPI) protocol, and the dimming control device delays and outputs the input data packet by one bit when the input data packet is input.

8. The system of claim 1, wherein when the input data packet further includes first data and second data, each dimming control device determines first identification information (ID), which is ID thereof, using a most significant bit (MSB) having a value set to "1" among bits included in the first data, extracts second ID, which is an ID of a dimming control device configured to process the dimming data among the plurality of dimming control devices, from the second data, and controls the light source using the dimming data when the first ID and the second ID match.

9. The system of claim 8, wherein the dimming control device includes:

a first-ID processing circuit configured to perform a first count operation in response to a first edge of a serial clock signal, and determine the first ID using a first count value that is a count value when the most significant bit (MSB) is input;

a second-ID processing circuit configured to perform a second count operation in response to the first edge of the serial clock signal, and extract the second ID from the second data using a second count value according to the second count operation;

a dimming-data processing circuit configured to extract the dimming data from the input data packet;

a selection circuit configured to store the dimming data when the first ID and the second ID match, and pass the dimming data when the first ID and the second ID do not match; and a dimming control circuit configured to control dimming of the light source using the dimming data stored by the selection circuit.

10. The system of claim 9, wherein the dimming control circuit controls the dimming of the light source with a PWM signal generated using a first bit group including the most significant bit (MSB) of the dimming data when a grayscale value corresponding to the dimming data is less than or equal to a predetermined reference value, and controls the dimming of the light source with an analog signal generated using a second bit group including a least significant bit (LSB) of the dimming data and a third bit group including bits excluding the first and second bit groups from the dimming data when the grayscale value corresponding to the dimming data is greater than the predetermined reference value.

11. The system of claim 8, wherein the dimming control device further includes a D-flip-flop circuit configured to capture the input data packet at a second edge of a serial clock signal, and delay and output the input data packet by one bit.

12. A method for controlling backlight unit comprising:

applying a first gate control signal to a first gate line when p input data packets to be processed by p first dimming control devices are input to the p first dimming control devices connected to the first gate line for each dimming control device group;

controlling, by the p first dimming control devices, dimming of light sources connected to the p first dimming control devices using dimming data included in each of the p input data packets according to the application of the first gate control signal;

applying a second gate control signal to a second gate line when p input data packets to be processed by p second dimming control devices are transmitted to the p second dimming control devices connected to the second gate line for each dimming control device group; and controlling, by the p second dimming control devices, dimming of light sources connected to the p second dimming control devices using dimming data included in each of the p input data packets according to the application of the second gate control signal.

13. The method of claim 12, wherein the dimming control device group includes N dimming control devices, and the N dimming control devices are connected in a daisy-chain manner to a micro controller unit configured to generate an input data packet for each dimming control device group.

14. The method of claim 13, wherein the micro controller unit generates the input data packet using the dimming data according to a serial peripheral interface (SPI) protocol, and the N dimming control devices delay and outputs the input data packet by one bit when the input data packet is input.

15. The method of claim 13, wherein the input data packet further includes first data and second data, each dimming control device determines first identification information (ID), which is ID thereof, using a most significant bit (MSB) having a value set to "1" among bits included in the first data, extracts second ID, which is an ID of a dimming control device designated to process the dimming data among the N dimming control devices, from the second data, stores the dimming data by determining corresponding input data packet as the input data packet to be processed by itself when the first ID and the second ID match, and passes the dimming data when the first ID and the second ID do not match.

16. The method of claim 15, wherein the dimming control device controls the dimming of the light source with a PWM signal generated using a first bit group including the most significant bit (MSB) of the dimming data when a grayscale value corresponding to the dimming data is less than or equal to a predetermined reference value, and controls the dimming of the light source with an analog signal generated using a second bit group including a least significant bit (LSB) of the dimming data and a third bit group including bits excluding the first and second bit groups from the dimming data when the grayscale value corresponding to the dimming data is greater than the predetermined reference value.

17. The method of claim 16, wherein, when the grayscale value corresponding to the dimming data is less than or equal to the predetermined reference value, a waveform and a duty ratio of the PWM signal for controlling the dimming of the light source are determined using bits included in the first bit group, a first transistor connected to the light source is controlled using the PWM signal generated based on the determined waveform and duty ratio of the PWM signal, and a second transistor connected to the first transistor is controlled using an analog signal corresponding to predetermined reference data.

18. The method of claim 17, wherein when the grayscale value corresponding to the dimming data is greater than the predetermined reference value, the PWM signal having a duty ratio of 100% is generated using bits included in the first bit group, the first transistor connected to the light source is turned on using the PWM signal having the duty ratio of 100%, and the second transistor connected to the first transistor is controlled using a signal corresponding to the analog signal generated using bits included in the second and third bit groups.

* * * * *